Patented Nov. 19, 1940

2,222,400

UNITED STATES PATENT OFFICE 2,222,400

PROCESS FOR REFINING A LOW BOILING HYDROCARBON DISTILLATE

John G. Butz, Drexel Hill, Pa.

No Drawing. Application April 9, 1937, Serial No. 135,899. Renewed May 14, 1940

5 Claims. (Cl. 196—28)

The present invention relates to the thermal treatment of hydrocarbons, and more particularly to the thermal treatment of relatively light petroleum hydrocarbons in the presence of an argillaceous adsorbent the internal structure or crystalline arrangement of which has been substantially altered or disrupted by mechanical mixing, kneading, grinding and/or shearing at high pressures.

A principal object of this invention is the application of highly efficient argillaceous adsorbents in the thermal treatment of petroleum hydrocarbons boiling up to about 600° F. Such adsorbent material is suitably employed as a catalyst or activating agent in thermal processes involving, for example, the cracking and/or polymerization of light petroleum oils or gases; the dehydrogenation or reforming of petroleum gasoline distillates; the desulfurization of petroleum gasoline distillates; and the polymerization and removal of undesirable gum and color-forming bodies from cracked gasoline.

The argillaceous adsorbent material or catalyst to be employed in accordance with my invention is preferably prepared from adsorbent clays such as raw fuller's earth, bentonite, montmorillonite and the like by a mechanical process involving mixing, kneading, grinding and/or shearing at high pressures and under conditions in which the grinding and/or shearing action involved produces a disruption or rearrangement of the normal internal or crystalline structure of the adsorbent particles. As a result of the disruption or rearrangement of the structure of the adsorbent particles, I have found that the efficiency thereof, particularly when employed in the thermal treatments above mentioned, is markedly increased and may be of the order of 20% to 50% more efficient than the argillaceous materials heretofore employed.

In accordance with my invention, the improved argillaceous adsorbents or catalysts are brought into intimate contact with relatively light petroleum hydrocarbons at temperatures preferably within the range of from about 300° F. to about 1500° F., and under atmospheric pressure or superatmospheric pressures up to about 3000 lbs. per sq. in., whereby a conversion or refining action is obtained, depending upon the character of the hydrocarbons and the conditions of treatment. In general my invention comprehends the utilization of the improved argillaceous adsorbent as a catalyst in the cracking of light petroleum oil such as gas oil for the production of gasoline; in the cracking and/or polymerization of petroleum hydrocarbon gases such as methane, ethane, ethylene, propane and propylene, butane and butylene in the production of motor fuels, solvents and the like; in the dehydrogenation or reforming of straight-run or low antiknock value petroleum distillates to produce gasoline of improved antiknock quality; in the desulfurization of cracked or uncracked petroleum naphthas or gasoline distillates; and in the polymerization and removal of undesirable gum and color-forming bodies from unstable or cracked gasoline distillates. Treatments of the above character may be effected under conditions in which the light hydrocarbons are substantially in the vapor phase, or alternatively, under conditions in which the hydrocarbons are substantially in the liquid phase.

In the preparation of the improved argillaceous adsorbent or catalyst to be employed in accordance with my invention, an adsorbent clay or fuller's earth, for example, such as that obtainable from the vicinity of Attapulgus, Georgia, having a water content or volatile matter adjusted to the order of 45% to 60% by weight, and more preferably about 53% to 57% by weight, is subjected to an intensive mixing, kneading and shearing action under pressure sufficiently high to disrupt the normal structure of the clay particles and to cause a rearrangement or reformation of the crystal structure thereof. Such intensive mixing, kneading and shearing action under high pressure is preferably accomplished by passing the clay through a screw-fed extrusion press wherein the clay particles are caused to rub against one another and against the surface of the screws and press walls at high pressure and are then forced through a die provided with a plurality of small holes. As a result of the combined mixing, kneading, shearing and/or compressive action of the screws and the press walls, the normal structure of the clay particles is disrupted and the crystalline nature of the particles is markedly altered. While the exact mechanism of the disruption and/or rearrangement is not definitely known, it appears that a substantial portion of the crystals comprising the clay particles are sheared and/or cleaved to form a multitude of new crystal faces having adsorptive or other physical properties similar to those of the active crystal faces normally occurring in the raw or unextruded clay. In other words, the properties or characteristics of the particles upon which the catalytic efficiency of the clay depends have been markedly enhanced by the increase in number of the active crystal faces resulting from the disruption and shearing at high pressure. The clay, after extrusion from the die, usually contains from about 40% to about 55% of water, and such clay is preferably subjected to drying to reduce the water content (volatile matter) thereof to about 10% to 25% by weight, and preferably to about 15% by weight.

The dried clay may then be ground and sifted to produce particles of desired size, for example, 30/60 mesh or finer. Such ground clay may be burned at temperatures of the order of 800° F. to 1100° F. to dehydrate same prior to use in accordance with my invention.

My invention may be further illustrated by the following examples, which show the improved results which may be obtained in accordance with my invention:

Raw, wet fuller's earth, having a water content (usually referred to as volatile matter) of the order of 53%–54% by weight was passed through a smooth roller crusher to render the earth free of lumps. The crushed earth was then fed to a twin-screw extrusion press provided with 2" diameter screws 10 inches in length operating at 23 R. P. M., the screws effecting an intense mixing, shearing and disrupting action upon the earth particles. The disrupted earth, fed by the screws at high pressure, was extruded through a die plate 1 inch in thickness provided with 6 holes each ⅜" in diameter. This mixing, kneading and/or disrupting operation was effected with a power input of 3 H. P. per lb. of earth per minute, based upon 15% water content earth. The disrupted earth was then dried at about 180° F. until the water content (or volatile matter) was about 15% by weight, and ground to 30/60 mesh. Microscopic and X-ray examination of the earth particles revealed that the natural physical structure or crystalline formation thereof was markedly disrupted, and that the laminated structure common to fuller's earth was substantially altered.

The fuller's earth prepared by the high pressure mixing, kneading and shearing operation above described was employed in the thermal treatment of light petroleum hydrocarbons, for example, debutanized gasoline, and comparative runs are shown in the following table. The debutanized gasoline was vaporized and passed, at substantially atmospheric pressure, into contact with the fuller's earth at a temperature of about 755° F., and the treated vapors were thereafter separated and condensed. The undisrupted fuller's earth employed as a comparison was raw fuller's earth which had been dried to 15% water content and ground to 30/60 mesh.

| Operating conditions | Charge | Contacted with disrupted fuller's earth | Contacted with undisrupted fuller's earth |
|---|---|---|---|
| Charge rate bbl. oil/ton earth/hour | | 6.35 | 7.00 |
| Temperature of contacting °F | | .755 | .755 |
| Contact time (vapor) seconds | | 7.23 | 6.78 |
| Gas production cubic feet/bbl. oil | | 84.7 | 93.5 |
| A. P. I. gravity of oil degrees | 52.9 | 52.5 | 52.4 |
| Gum content mg./100 cc., copper dish | 185 | 36 | 86 |
| Sulfur percent | 0.202 | 0.069 | 0.102 |
| Induction period hours | No break | 4¼ | 2¼ |
| Octane number | 64 | 67 | 68 |
| Assay distillation: | | | |
| Initial boiling point °F | 129 | 114 | 118 |
| 10% °F | 196 | 184 | 185 |
| 50% °F | 280 | 274 | 276 |
| 95% °F | 380 | 384 | 384 |
| End point °F | 396 | 442 | 425 |

It will be seen, from the above data, that treatment of the light hydrocarbon distillate with disrupted fuller's earth produced substantially better results than the treatment with ordinary or undisrupted fuller's earth. By employing the disrupted earth there was obtained a sulfur reduction of 66% compared with 50% for the unextruded earth, an induction period of 4¼ hours as compared with 2¼ hours, or an increase of the order of 100%, and a reduction in gum content of 80% as compared with 47%.

In accordance with my invention petroleum hydrocarbons or hydrocarbon mixtures may be refined or improved by contacting with disrupted fuller's earth at various temperatures and pressures, depending upon the nature of the hydrocarbons and the results desired. For example, cracked gasoline may be rendered stable against color and gum-formation by contacting with disrupted earth at temperatures within the range of from about 300° F. to about 500° F. and at atmospheric or higher pressures. In this instance the refined product will be stabilized against color and gum formation but no substantial reduction in sulfur content or improvement in octane value will be obtained. At temperatures of the order of 550° F. to about 850° F. a substantial removal of sulfur compounds may be effected. And, depending somewhat upon the nature of the gasoline distillate, an improvement in octane number of anti-knock value may be obtained at temperatures of from about 700° F. to about 1200° F., at atmospheric or higher pressures.

In the cracking of heavier hydrocarbon oil, for example, gas oil, to produce motor fuels, such conversion may be advantageously effected in the presence of disrupted fuller's earth at temperatures of the order of 750° F. to 1100 F. under pressures up to about 1000 lbs./sq. in.

The conversion of the normally gaseous hydrocarbons, such as ethane, propane and butane and the corresponding olefines, into motor fuel of the gasoline boiling range may be substantially improved by effecting the cracking and/or polymerization reactions in the presence of disrupted fuller's earth. The conversion operation is preferably carried on at temperatures of the order of 900° F. to 1350° F. and under pressures of about 600 to 1500 lbs./sq. in. In a preferred modification of the conversion process, the normally gaseous hydrocarbons are subjected to cracking at temperatures of about 1200° F. to 1350° F. in the presence of the disrupted fuller's earth and the products of the cracking operation are cooled and caused to polymerize, in the presence of the disrupted earth, at temperatures of from about 700° F. to about 1150° F. Such process is suitably carried on at pressures of the order of from 500 to 2,000 lbs./sq. in.

In the treatment of light petroleum hydrocarbons or hydrocarbon mixtures as hereinbefore described, it has been found that fuller's earth which has been subjected to high pressure mixing, kneading, and/or shearing is so altered with respect to crystal structure or arrangement that the efficiency thereof is increased on the order of 20% to 50% over the commercial fuller's earth heretofore available. This marked improvement in efficiency resulting from the mixing, kneading and/or shearing operation appears to be confined to the naturally occurring earth such as raw fuller's earth, montmorillonite and bentonite, wherein the natural structure has not been altered or destroyed by activating treatments such as acid activation with mineral acids or other agents.

While I have particularly described the use of the disrupted fuller's earth in the refining and/or conversion of light petroleum hydrocarbons, i. e., boiling below about 600° F., I may also employ such argillaceous material as a catalyst in the hydrogenation of petroleum, tar oils, rubber and the like, or as a dehydrating catalyst in the treatment of alcohols to produce olefines. Such disrupted argillaceous materials may also be advantageously employed as catalyst carriers or supporting agents for metals or metal salts in various chemical reactions involving the use of catalysts.

What I claim is:

1. In a process for refining a low boiling hydrocarbon distillate of substantially the boiling range of gasoline, the steps which comprise contacting said distillate, at temperatures of the order of from 300° F. to 850° F., with fuller's earth the natural physical structure of which has been substantially disrupted by mixing, kneading, and shearing under high pressure, and separating said distillate from said fuller's earth.

2. The steps of process as recited in claim 1, wherein the disrupted fuller's earth employed has been burned at temperatures of from about 800° F. to about 1100° F.

3. The steps of process as recited in claim 1, wherein the contacting of the distillate with disrupted fuller's earth is carried on under substantial superatmospheric pressure.

4. In a process for refining a low boiling hydrocarbon distillate of substantially the boiling range of gasoline, the step which comprises contacting said distillate, at a temperature of from about 300° F. to about 550° F., with fuller's earth of the character of that mined in the vicinity of Attapulgas, Ga., the natural physical structure of which has been substantially disrupted by mixing, kneading, and shearing under high pressure, so that its normal treating characteristics have been substantially enhanced.

5. The step of process as recited in claim 4, wherein contacting of the distillate with the disrupted earth is effected at a temperature of from about 550° F. to about 850° F., instead of at temperatures within the range recited in claim 4.

JOHN G. BUTZ.

CERTIFICATE OF CORRECTION.

Patent No. 2,222,400. November 19, 1940.

JOHN G. BUTZ.

It is hereby certified that the above numbered patent was erroneously issued to the inventor, said "BUTZ" whereas said patent should have been issued to --Attapulgus Clay Company, of Philadelphia, Pennsylvania, a corporation of Delaware, as assignee of the entire interest therein; page 2, first column, line 34, before the word "fuller's" insert --raw--; and second column, line 31, for "1100 F." read --1100° F.--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.

CERTIFICATE OF CORRECTION.

Patent No. 2,222,400. November 19, 1940.

JOHN G. BUTZ.

It is hereby certified that the above numbered patent was erroneously issued to the inventor, said "BUTZ" whereas said patent should have been issued to --Attapulgus Clay Company, of Philadelphia, Pennsylvania, a corporation of Delaware, as assignee of the entire interest therein; page 2, first column, line 34, before the word "fuller's" insert --raw--; and second column, line 31, for "1100 F." read --1100° F.--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.